No. 631,728. Patented Aug. 22, 1899.
G. W. SHAILER.
CULTIVATING TOOL.
(Application filed Apr. 9, 1898.)
(No Model.)
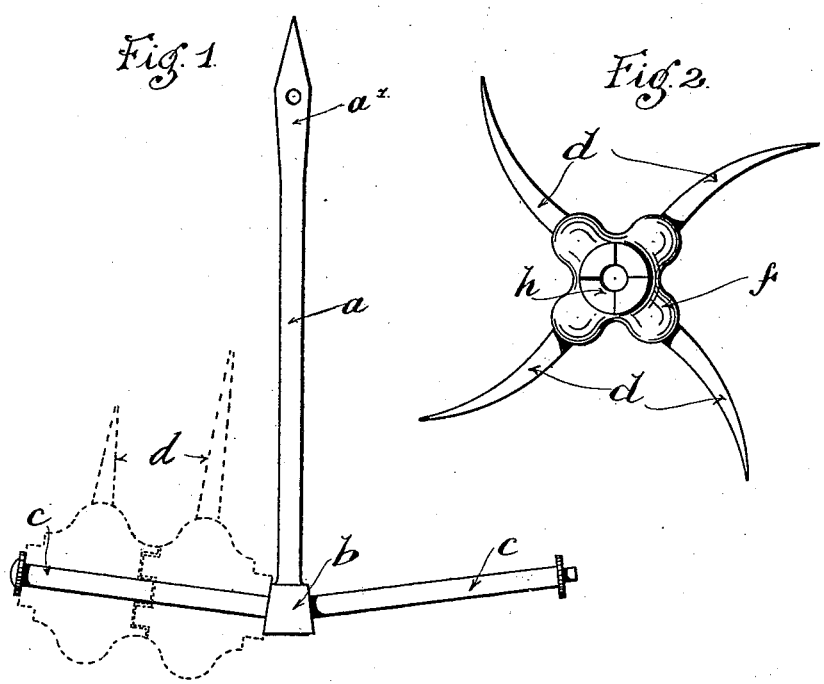
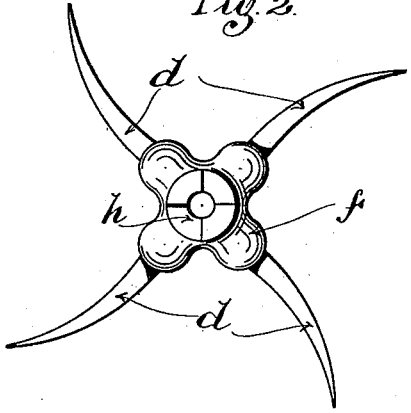
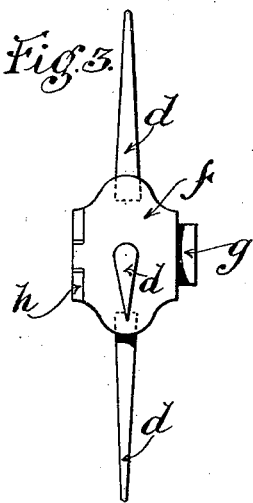
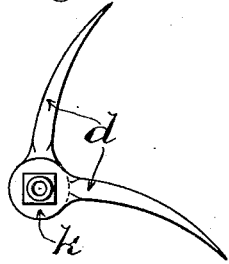
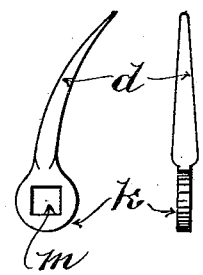
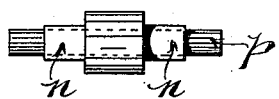
Witnesses.
Benjamin Clark.
Charles H. Briggs.
Inventor,
George William Shailer
per:- E. Eaton,
His Attorney.

UNITED STATES PATENT OFFICE.

GEORGE W. SHAILER, OF LONDON, ENGLAND.

CULTIVATING-TOOL.

SPECIFICATION forming part of Letters Patent No. 631,728, dated August 22, 1899.

Application filed April 9, 1898. Serial No. 677,068. (No model.)

*To all whom it may concern:*

Be it known that I, GEORGE W. SHAILER, a subject of the Queen of Great Britain, and a resident of London, England, have invented certain new and useful Improvements in Cultivating-Tools, (for which I have obtained a patent in Great Britain, No. 26,167, dated November 10, 1897,) of which the following is a full, clear, and exact specification.

My invention relates to a new or improved garden-cultivating tool or appliance, the object being to provide a garden-tool which while being but little, if any, heavier than an ordinary spade does the combined work of a fork and rake with considerably less labor than is required to use either of the aforementioned articles separately, while my improved tool quickly pulls weeds to the surface and thoroughly breaks up the ground to the depth of several inches. It is further particularly suitable for use between rows of growing seeds and in flower-beds and the like.

In order that my invention may be fully understood, I will now proceed to describe same with reference to the accompanying drawings, in which—

Figure 1 is an elevation of the end or head of the tool designed to receive the revolving parts. Fig. 2 is a side elevation of one of the revolving parts carrying the "tines;" Fig. 3, a view at right angles to Fig. 2. Fig. 4 illustrates a modified form of my invention wherein the tines are formed separately and carried by a squared portion of a suitable core or spindle. Fig. 5 shows one of the tines detached. Fig. 6 is a side elevation of the core or spindle above referred to.

According to my invention I provide a vertical shaft $a$, formed at one end with a socket $a'$, designed to receive an ordinary wooden handle or the like of suitable length, the other end of the shaft $a$ being preferably formed with a boss $b$, having at each side a projecting arm $c$, designed to carry the tines, as indicated in dotted lines, Fig. 1, and upon which they revolve.

The tines $d$, Figs. 1 to 3, are formed of steel, malleable iron, or other suitable material and are carried by a boss $f$, formed with a shoulder or collar $g$, the tines being curved or shaped as shown.

Two sets of tines are placed upon each arm $c$ and secured together by means of a suitable clutch, such as $h$, Figs. 2 and 3, in such a manner that the tines carried by the second boss, both sets of tines revolving together by means of the clutch arrangement, while the width of the bosses carrying the tines is arranged so as to correspond with the length of the arm $c$. It will thus be seen that the tool carries four sets of tines—viz., two sets on each arm—but I do not restrict myself to this exact number, as one set or two or more sets may be mounted upon each arm, as required.

In order to use the tool, the tines are pressed into the ground and the tool pushed forward, which causes the said tines to quickly revolve, each tine in succession embedding itself in the ground and quickly breaking it up and bringing to the surface weeds and the like, while owing to the arms $c$ being slightly bent the tines are given a sidewise motion, which more thoroughly stirs and breaks up the ground.

As a slightly-modified form of my invention the tines $d$ may be formed separately, as shown at Figs. 4 and 5, each tine being formed with a preferably circular portion $k$, furnished with a square hole $m$, in such a manner that they may be passed onto the squared portion $n$ of a core or spindle $p$, Fig. 6, where they would be riveted or otherwise suitably secured in position, the core being then placed upon the arm $c$ in a similar manner to the ordinary tines, as above described.

Having thus described my invention, what I claim, and desire to secure by Letters Patent, is—

The new or improved garden-cultivating tool comprising a vertical stem having side projecting arms and upon which are mounted bosses connected together by means of any suitable clutch arrangement and carrying projecting tines substantially as described and shown and for the purpose specified.

In testimony that I claim the foregoing I have hereunto set my hand this 22d day of March, 1898.

G. W. SHAILER.

Witnesses:
BENJAMIN CLARK,
WILLIAM JOHN WEEKS.